United States Patent
Wang et al.

(10) Patent No.: US 8,836,192 B2
(45) Date of Patent: Sep. 16, 2014

(54) AXIAL GAP ROTATING ELECTRICAL MACHINE AND ROTOR USED THEREFOR

(75) Inventors: Zhuonan Wang, Hitachi (JP); Yuji Enomoto, Hitachi (JP); Ryoso Masaki, Narashino (JP); Hiromitsu Itabashi, Tottori (JP); Tomio Yoshikawa, Mishima (JP)

(73) Assignees: Hitachi Industrial Equipment Systems Co., Ltd., Tokyo (JP); Hitachi Metals, Ltd., Tokyo (JP); Hitachi Appliances, Inc., Tokyo (JP)

( * ) Notice: Subject to any disclaimer, the term of this patent is extended or adjusted under 35 U.S.C. 154(b) by 1 day.

(21) Appl. No.: 12/979,568

(22) Filed: Dec. 28, 2010

(65) Prior Publication Data

US 2011/0156519 A1 Jun. 30, 2011

(30) Foreign Application Priority Data

Dec. 28, 2009 (JP) ................................. 2009-298070

(51) Int. Cl.
*H02K 1/27* (2006.01)
*H02K 21/24* (2006.01)

(52) U.S. Cl.
CPC .............. *H02K 21/24* (2013.01); *H02K 1/2793* (2013.01)
USPC ...................................... 310/114; 310/156.32

(58) Field of Classification Search
USPC ......... 310/114, 164, 156.32, 112, 113, 49.02, 310/49, 22, 49.32, 49.42, 162, 156.64, 310/156.01, 156.25, 156.62
See application file for complete search history.

(56) References Cited

U.S. PATENT DOCUMENTS

| | | | | |
|---|---|---|---|---|
| 3,953,751 | A | * | 4/1976 | Merkle et al. .................... 310/91 |
| 3,999,092 | A | * | 12/1976 | Whiteley ................. 310/156.32 |
| 4,286,188 | A | * | 8/1981 | Honsinger et al. ............ 310/162 |
| 4,363,988 | A | * | 12/1982 | Kliman ......................... 310/268 |
| 4,394,597 | A | * | 7/1983 | Mas .............................. 310/268 |
| 5,982,070 | A | * | 11/1999 | Caamano ............... 310/216.047 |
| 6,278,212 | B1 | * | 8/2001 | Kalsi ............................ 310/162 |
| 6,784,588 | B2 | * | 8/2004 | DeCristofaro et al. 310/216.065 |
| 6,803,694 | B2 | * | 10/2004 | Decristofaro et al. . 310/216.106 |
| 7,960,884 | B2 | * | 6/2011 | Miyata et al. ............ 310/156.12 |
| 2006/0197401 | A1 | | 9/2006 | Takamatsu et al. |
| 2007/0152526 | A1 | * | 7/2007 | Tsai et al. ................ 310/156.32 |
| 2007/0194649 | A1 | * | 8/2007 | Schafer et al. ........... 310/156.32 |
| 2008/0191562 | A1 | | 8/2008 | Kojima et al. |
| 2012/0146445 | A1 | * | 6/2012 | Tokoi et al. .............. 310/156.37 |

FOREIGN PATENT DOCUMENTS

| | | |
|---|---|---|
| JP | 60-162949 | 10/1985 |
| JP | 07-326533 | 12/1995 |
| JP | 2000-78787 | 3/2000 |
| JP | 2002-262482 | 9/2002 |

(Continued)

OTHER PUBLICATIONS

Office Action issued in Japanese Patent Application No. 2009-298070 on Sep. 10, 2013.

*Primary Examiner* — Quyen Leung
*Assistant Examiner* — Naishadh Desai
(74) *Attorney, Agent, or Firm* — Antonelli, Terry, Stout & Kraus, LLP.

(57) ABSTRACT

In the axial gap rotating electrical machine, the rotor includes a rotor yoke that is formed by wrapping amorphous ribbon wound toroidal core, which is obtained by winding an amorphous magnetic metal ribbon into a toroidal core. Magnets having plural poles are circumferentially disposed on a stator-facing surface of the amorphous ribbon wound toroidal core.

11 Claims, 6 Drawing Sheets

(56) References Cited

FOREIGN PATENT DOCUMENTS

| JP | 2006-25482 | 1/2006 |
| JP | 2006-166634 | 6/2006 |
| JP | 2006-187064 | 7/2006 |
| JP | 2007-089270 | 4/2007 |
| JP | 2007089270 A * | 4/2007 |
| JP | 2008-86142 | 4/2008 |
| JP | 2008-99453 | 4/2008 |
| JP | 2008-131682 | 6/2008 |
| JP | 2009-284578 | 12/2009 |
| JP | 2010-115069 | 5/2010 |

* cited by examiner

AXIAL GAP ROTATING ELECTRICAL MACHINE AND ROTOR USED THEREFOR

CLAIM OF PRIORITY

The present application claims priority from Japanese patent application serial no. 2009-298070, filed on Dec. 28, 2009, the content of which is hereby incorporated by reference into this application.

FIELD OF THE INVENTION

The present invention relates to an axial gap rotating electrical machine in which a stator and a rotor are opposed to each other in an axial direction of a rotary shaft with a gap therebetween. The present invention also relates to the rotor.

BACKGROUND OF THE INVENTION

As regards rotating electrical machines such as an axial gap motor, there are known various structures and related technologies.

For example, in a rotor structure for an axial gap motor, which is disclosed in JP2006-166634A, mutually opposite polarity permanent magnets as rotor magnetic poles are alternately disposed in a circumferential direction of a rotor core made of a magnetic material; and the circumferential length of each permanent magnet varies along an axial direction of the permanent magnet so as to increase from an axial gap side (a side facing to a stator) of a rotor to the opposite side thereby so as to form a taper in the circumferential surface of the permanent magnet in order to ensure that a magnetic flux of the permanent magnet on the rotor side concentrate on the side facing an axial air gap of the rotor (on the side facing the stator). Such a rotor core is formed by laminating stamped electromagnetic steel sheets having slots (permanent magnet insertion holes) or by using a powder magnetic core (obtained by mixing iron powder or other magnetic powder with resin or other insulator and solidifying the mixture) with holes.

JP 2007-89270A discloses an axial gap motor in which a rotor is provided with beam-like reinforcements in a radial direction of the rotor and a ring (hoop-shaped member) for retaining the beam-like reinforcement members to increase the rigidity of the rotor. The beam-like reinforcements are joined to the ring through a nonconductive material in order to reduce a loss of an eddy current flowing between the beam-like reinforcement members and the tubular member. A magnetic permeable portion of the rotor is configured with laminated electromagnetic steel sheets or a powder magnetic core which are materials hard to flow the eddy current.

In an axial gap rotating electrical machine, a positional relationship between rotor side magnets (permanent magnets) and a stator core, which are opposed to each other, varies with the rotation of the rotor, and such a variation of the positional relation ship causes a variation of a magnetic flux passing through a rotor. By such a variation of the magnetic flux, the rotor has an occurrence of the eddy current loss.

In order to reduce the eddy current loss, preferably, the material with high resistance is used to reduce the eddy current loss. Laminated electromagnetic steel sheets and a powder magnetic core are generally used as a permeable material to reduce eddy current. However, provided that the electromagnetic steel sheets are laminated in a radial direction of the rotor, a centrifugal force of the rotor becomes great. Therefore, provided that the laminated electromagnetic steel sheets are used as a rotor yoke, the rotor needs a metal reinforcement, a stamping work and a thermal treatment.

Further, since a laminated core comprised of stamped electromagnetic steel sheets has a large residual stress, it needs to use a retention means other than an adhesive. In addition, joining between the permanent magnets and the rotor yoke also needs consideration of enhancing a joint strength therebetween.

As described in JP2006-166634A, in the case of the axial gap motor inserting stepped fan-shaped permanent magnets into holes (slots) formed in the laminated electromagnetic steel sheets, shapes of the rotor yoke and magnets are complicated. As a result, increasing the number of manufacturing process steps, raising the cost of manufacturing, and limiting the degree of freedom in changing the shapes of the magnets.

As described above, in JP2007-89270A, in order to maintain the strength of the laminated electromagnetic steel sheets as a rotor yoke, the axial gap motor is provided with plural beam-like reinforcements between each pair of magnets and a hoop-shaped member attached to the outer circumference of a rotor core. A nonmagnetic material since is provided between the beam-like reinforcement members and the hoop-shaped member, no eddy current flows to a loop of the reinforcements. However, the hoop-shaped member since is a ling in form, if no particular provision is made, it is highly probable that the hoop-shaped member may allow an eddy current to flow to the outer circumference. It should also be noted that the use of the reinforcements is likely to make an assembly process complex and increase the cost.

The present invention is proposed in view of the above circumstances, and provides an axial gap rotating electrical machine capable of reducing the eddy current loss in the rotor yoke, maintaining the strength of the rotor without using a complex structure, making the assembly process simple and easy, and reducing the cost. The present invention also provides a rotor for use in axial gap rotating electrical machine.

SUMMARY OF THE INVENTION

A rotor in the axial gap rotating electrical machine of the present invention is basically comprised of: an amorphous ribbon wound toroidal core (disk shape with a scroll); and permanent magnets which are mounted on a stator-facing surface of the amorphous ribbon wound toroidal core and disposed in the circumferential direction of the amorphous ribbon wound toroidal core.

According to the rotor structure of the axial gap rotating electrical machine of the present invention, it is possible to reduce eddy current loss in the rotor of the axial gap rotating electrical machine, simplify the manufacturing process, and provide a low-cost rotor.

DETAILED DESCRIPTION OF THE INVENTION

An axial gap motor will now be described below as an example of an axial gap rotating electrical machine embodying the present invention. However, it should be noted that the configuration described below can be applied not only to a motor but also to a generator.

Axial gap motors can generally achieve a configuration with a pair of rotors disposing on both sides of a stator with an air gap between each rotor and the stator. Therefore, the axial gap motors are characterized with increased torque density (torque per volume). However, it is known that eddy current induced by slot harmonics flows to a rotor yoke on a magnet-mounting surface due to the moving magnetic field, caused by the change of the rotor and stator positions. As for eddy current loss, it will be not a cause for concern at low rotational speed. However, eddy current loss leads to dramatic decrease in efficiency when motors are operated at high speeds. As such being the case, embodiments of the present invention propose the following axial gap motor.

First Embodiment

A first embodiment of the present invention will now be described with reference to FIGS. 1 to 7.

Figure 1:
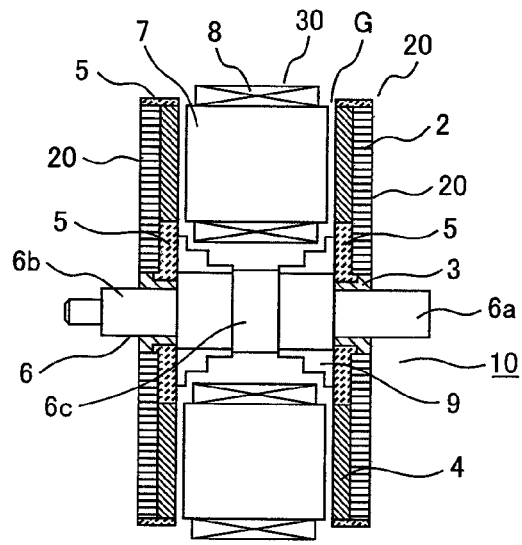
FIG. 1 is a cross-sectional view illustrating the overall configuration of an axial gap motor according to a first embodiment of the present invention.

FIG. 1 shows an example of an axial gap motor according to the first embodiment of the present invention. In FIG. 1, a rotor and a stator are shown with a motor housing removed (not shown).

The axial gap motor 10 is configured so that a rotor 20 and a stator 30 are opposed to each other in an axial direction of a rotor shaft 6 with a gap G. The present embodiment examples the axial gap motor including two rotors and one stator in order to provide enhanced motor efficiency but it doesn't limit such a type thereof.

Referring to FIG. 1, each of electromagnets, which constitute the stator 30, is formed by a coil-mounted stator core which is obtained by mounting an electromagnetic coil 8 on each stator core 7. The electromagnetic coil 8 is wound around the stator core 7 in such a manner that its center is positioned in parallel with the axis of the rotor shaft 6. Plural coil-mounted stator cores (electromagnets) 7 are securely disposed around a rotor shaft 6 and circumferentially spaced at equal intervals.

The present invention although is sufficient for the axial gap motor to have at least one rotor 20 opposed to the stator 30 in a direction parallel to the axis of the rotor shaft 6, the motor of the present embodiment examples two (a pair of) rotors to provide enhanced motor efficiency. More specifically, the pair of rotors 20 is fixed to the rotor shaft 6 such that the stator 30 is disposed between the two of the rotors 20 in a direction parallel to the axis of the rotor shaft 6 with an air gap G between each rotor 20 and the stator 30. As described above, the present embodiment is exampled as a two-rotor/one-stator type axial gap motor that comprises one stator made of an assembly of coil-mounted stator cores 7 and two (a pair of) disc-shaped (toroidal shaped) rotors 20 disposed on both sides of the stator 30.

The air gap G is kept by a sleeve-shaped spacer 9 which is positioned between each rotor 20 and a ring-shaped portion 6c at a middle point of the rotor shaft 6. Both-side parts 6a, 6b of the rotor shaft 6, which are extended on both sides of a rotor mounted portion, are borne by the motor housing via a bearing (not shown).

Each of the rotors 20 comprises a rotor yoke (rotor core) 2, a rotor shaft use boss 3, and plural permanent magnets 4 that are disposed in the circumferential direction of a rotor and spaced at equal intervals. The present embodiment examples six fan-shaped plate permanent magnets (six poles) being circumferentially disposed. However, the present invention is not limited to the use of such permanent magnets. The plural permanent magnets 4 are circumferentially disposed in such a manner that polarity alternates between N and S. A rotating magnetic field is formed by the electromagnets constituting the stator 30, and thereby the rotors 20 rotate when the plural electromagnets on the stator 30 side and the permanent magnets on the rotor 20 side repeatedly cause magnetic attraction and repulsion around the rotary shaft.

Each of the rotors 20 in the present embodiment is configured so that the rotor yoke 2 is made of an amorphous ribbon wound toroidal core, which is obtained by wrapping an amorphous magnetic ribbon into a toroidal core. A rotor manufacturing process and a finished product of a rotor 20 will now be described with reference to FIGS. 2 to 7.

Figure 2:
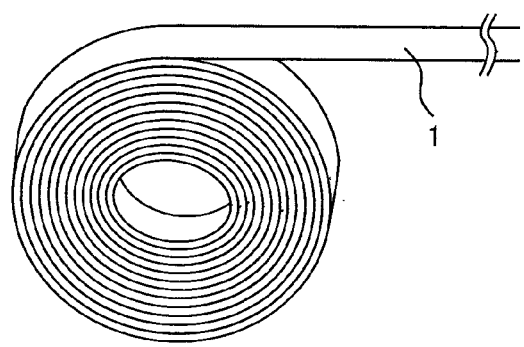
FIG. 2 is a perspective view illustrating a winding process for producing a rotor yoke (amorphous ribbon wound toroidal core) for use in axial gap motor according to the first embodiment of the present invention.
Figure 3:
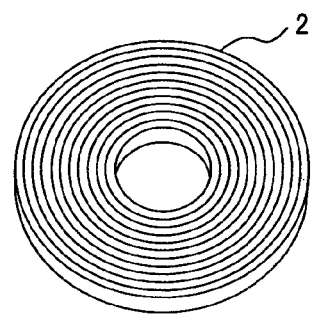
FIG. 3 is a perspective view illustrating the amorphous ribbon wound toroidal core obtained upon completion of the winding process.

FIG. 2 shows a process of winding an amorphous magnetic metal ribbon for forming the amorphous ribbon wound toroidal core as the rotor yoke. As shown in FIG. 2, the amorphous magnetic ribbon 1, for example, an iron-based amorphous magnetic ribbon, a cobalt-based amorphous magnetic ribbon or the like having 0.025 mm thickness is wound into a toroidal core (disk shape with a scroll) by using a high-speed winding machine to a diameter of the toroidal core reaches a required rotor yoke diameter. After finish the winding process, the ribbon 1 is cut at a winding finish point. The start end and the finish end of the amorphous ribbon wound toroidal core (rotor yoke) 2 are then bonded to the amorphous ribbon wound toroidal core 2, respectively, without changing their positions. As a result, the rotor yoke 2 shown in FIG. 3 is formed. The magnetic ribbon as the rotor yoke 2 of the present embodiment is characterized in that it is recommended to be made of amorphous material because it is very thin. The conventional silicon-iron (Si—Fe) alloy sheet can be also be wrapped into a toroidal core. However, the following problems have to be concerned. The Si—Fe alloy sheet has a thickness of 0.2 to 0.5 mm, which is 10 times thicker than amorphous ribbon. The thickness of Si—Fe alloy sheet makes it difficult to be bent because it is less flexible than the amorphous magnetic metal ribbon. Therefore, if the Si—Fe alloy sheet is wound into a toroidal coil, it need more fixing means other than bounding with adhesive. It cannot be fixed in the appropriate wound state even when using an adhesive alone because a force for reverting the steel sheet to a linear form the coil shape is greater than residual stress. In addition, the manufacturing cost increases because after-treatment processes such as a thermal treatment process are required to reduce hysteresis loss. When Si—Fe alloy laminated core is used as a rotor yoke, a process for bonding permanent magnets to the rotor core is complicated. In JP2006-166634A, an assembly of the laminated electromagnetic steel sheets is provided with insertion holes, a rear side of each of the permanent magnets is provided with a protrusion, and the protrusion is inserted into each hole. According to the above-mentioned structure of in JP2006-166634A, the shapes of the permanent magnets may be complicated to further raise the manufacturing cost. Furthermore, when such holes are made in the laminate surface of the laminated electromagnetic steel sheets, the laminate surface may leave burrs thereby to make interlayer insulation ineffective. An eddy current may flow on a surface having the holes in the assembly of the laminated electromagnetic steel sheets, it might be necessary to perform a process, for instance, for removing such burrs. On the other hand, the amorphous magnetic metal ribbon since can be easily wound into the toroidal core (disk shape with a scroll), it has an advantage capable of being formed into the toroidal coil shape form with an adhesive alone. Moreover, the amorphous metals since have resistivity than that of the electromagnetic steel sheets. Therefore, the use of an amorphous metal makes it possible to reduce the loss caused by the eddy current loss.

Figure 4:
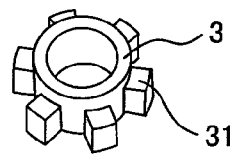
FIG. 4 is a perspective view illustrating an example of a rotor shaft use boss to be incorporated into the amorphous ribbon wound toroidal core.
Figure 6:
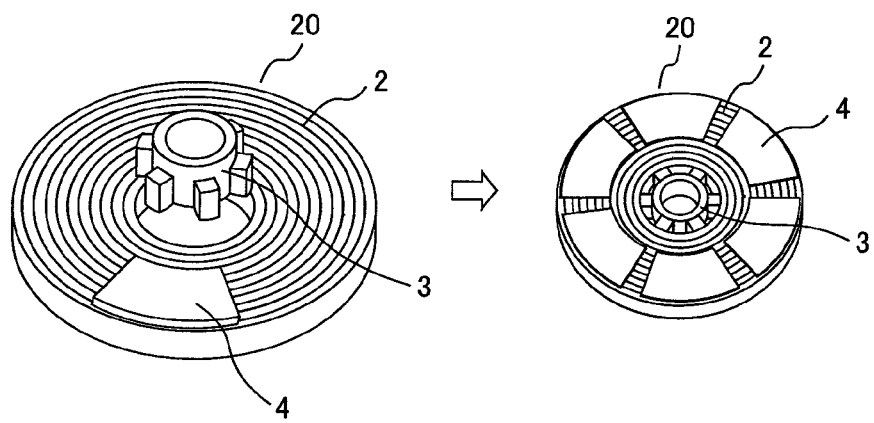
FIG. 6 is a set of perspective views illustrating a typical process for assembling a rotor of the axial gap motor according to the first embodiment of the present invention.

FIG. 4 shows an example of the rotor shaft use boss 3 in the present embodiment. As shown in FIG. 6, the rotor shaft use boss 3 is inserted into an inside portion of the amorphous ribbon wound toroidal core (rotor yoke) 2. The boss 3 is provided with plural ribs 31 on an outer circumference of the boss 3 in order to increase an coupling strength between the boss 3 and the amorphous ribbon wound toroidal core 2 when bonding the boss 3 with the amorphous ribbon wound toroidal core 2 by a resin 5 (see FIGS. 1 and 7). The resin 5 flows into a space unoccupied by the ribs between the outside diameter of the boss 3 and the inside diameter of the rotor yoke (the amorphous ribbon wound toroidal core 2), thereby increasing the strength of bonding between the rotor shaft use boss and the rotor yoke. The rotor shaft use boss 3 may be made of a general-purpose structural member that looks like the one shown in FIG. 4.

Figure 5:
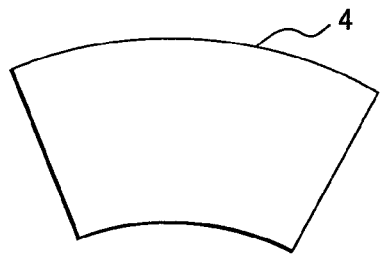
FIG. 5 is a diagram illustrating an example of one of magnets that are used as rotor magnetic poles to be joined to the amorphous ribbon wound toroidal core.

FIG. 5 shows an example of one of rotor use permanent magnets (magnetic poles) 4 used in the present embodiment. In the present embodiment, the rotor magnets 4 are shaped like a fan having an angle of 50° in order to exemplify a 6-pole motor. Alternatively, however, a ring-shaped and integral rotor magnet may be used. The number of the rotor magnets is not limited to the example. The rotor magnets 4 are configured so that N and S poles are formed on the front and back surfaces (in the direction of the rotary shaft).

Six poles of the above-described rotor magnets 4 are mounted on a surface of each amorphous ribbon wound toroidal core (rotor yoke) 2 being opposed to the stator. The rotor magnets 4 are securely disposed in the circumferential direction of the rotor yoke in such a manner that polarity alternates between N and S. In the present embodiment, the rotor magnets 4 are structured as multipole segmented magnets. However, the present invention is not limited to the use of such rotor magnets. For example, a disc-shaped magnet may alternatively be used to produce a magnetization skew effect. In the present embodiment, the shape, material, and thickness of the magnets are not specifically limited and can be determined as desired.

As shown in FIG. 6, the rotor shaft use boss 3 is inserted into the inside (inner radius) of the amorphous ribbon wound toroidal core 2, and then the rotor magnets 4 are disposed on a surface of the amorphous ribbon wound toroidal core 2. Next, these members are integrally joined together with the resin 5 as shown in FIG. 7.

Figure 7:
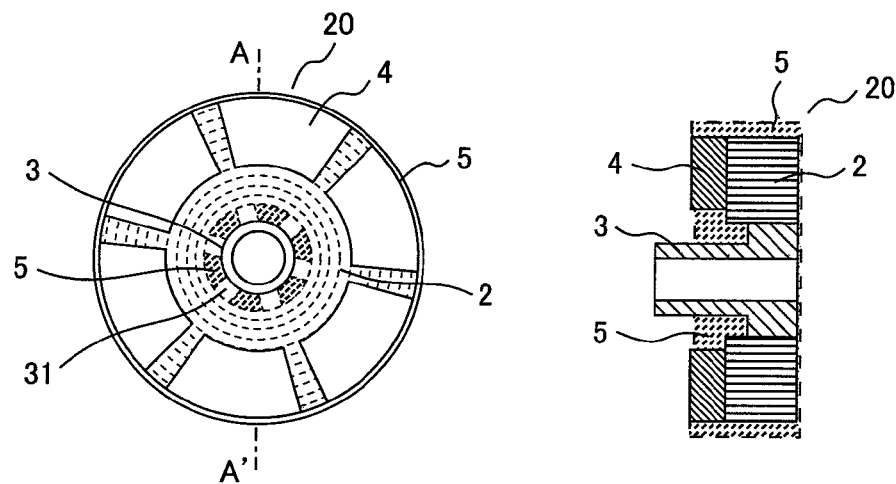
FIG. 7 is a set of a front view and a cross-sectional view, in which the front view illustrates outer coating resin applied to the rotor of the axial gap motor according to the first embodiment of the present invention, and the cross-sectional view is taken along line A-A' in the front view.

FIG. 7 is a set of a front view of a finished rotor and a cross-sectional view thereof taken along line A-A' in the front view. The finished rotor is obtained by impregnating the elements of a rotor assembly, namely the amorphous ribbon wound toroidal core (rotor yoke) 2, the rotor shaft use boss 3, and the rotor magnets 4, with a resin 5 for bonding the elements. The cross-sectional view taken along line A-A' in the front view of the rotor 20 presents a deformed view illustrating the members of the rotor 20 shown in FIG. 1.

In the present embodiment, the impregnated resin 5 functions as an adhesive. Any type of resin 5 may be used as far as its insulation performance and fluidity are high enough to exhibit adequate strength. If, for instance, thermoplastic resin is to be used, engineering plastic materials such as PPS (polyphenylene sulfide), PC (polycarbonate), and PET (polyethylene terephthalate) are suitable for the present embodiment. If, on the other hand, thermosetting resin is to be used, epoxy resin and unsaturated polyester are considered to be suitable for the present embodiment. It is conceivable that one of the following bonding (coupling) method can be used.

(1) Bonding method 1: i) Vacuum-impregnating the amorphous ribbon wound toroidal core 2 with the resin; ii) disposing the rotor magnets 4 at predetermined positions of one surface of the resin-impregnated amorphous ribbon wound toroidal core 2 and bonding the rotor magnets 4 to the amorphous ribbon wound toroidal core 2 through surface-impregnated resin; and iii) setting the rotor shaft use boss 3 inside the amorphous ribbon wound toroidal core 2 and impregnating the rotor shaft use boss 3 with the resin.

(2) Bonding method 2: i) Disposing the rotor magnets 4 at predetermined position of one surface of the amorphous ribbon wound toroidal core 2; ii) setting the rotor shaft use boss 3 inside the amorphous ribbon wound toroidal core 2; iii) vacuum-impregnating the amorphous ribbon wound toroidal core 2, the rotor magnets 4, and the rotor shaft use boss 3 with the resin.

(3) Bonding method 3: i) Vacuum-impregnating the amorphous ribbon wound toroidal core 2 with the resin; ii) fixing the rotor shaft use boss 3 to the inside of the amorphous ribbon wound toroidal core with screws or other fastener, and iii) disposing the rotor magnets 4 on one surface of the amorphous ribbon wound toroidal core 2 and impregnate the rotor magnets 4 with the resin.

When using any one of the above-mentioned bonding methods, the impregnated resin 5 coats an one side surface of the amorphous ribbon wound toroidal core 2, the one side surface to which the rotor magnets 4 are fixed, an outer and inner circumferential surface of the core 2, and a non-magnet-mounted surface (another side surface) of the core 2 except for the magnet surfaces as shown in FIG. 7. The resin coat on the surface of the amorphous ribbon wound toroidal core 2 on which the rotor magnets 4 are disposed (that is, the resin coat on a surface facing the stator and on an air gap side surface) are substantially flush with or slightly lower than the surfaces of the rotor magnets 4 in order to reduce air resistance over the air gap. The rotor shown in FIG. 7 can be produced by performing any one of the above mentioned methods. The three kind of parts in the rotor (rotor yoke, rotor magnets, and rotor shaft use boss) since are integrally bonded together with the resin 5, the strength of the rotor can be enhanced so as to be capable of rotating the rotor at a high speed. Further, interlayer insulation can be provided at each interlayer of the amorphous ribbon wound toroidal core 2 simply by performing vacuum resin impregnation.

The integrally bonded structure, which is established through the resin as one of the rotor members resin according to the present embodiment, can also be applied to an axial gap motor having a different rotor structure. It should also be noted that the amorphous ribbon wound toroidal core can be integrally bonded to the magnets by welding in place of using resin.

The present embodiment can have the following advantages:

(1) The rotor yoke 2 since is comprised of the amorphous ribbon wound toroidal core, and the direction of its amorphous metal ribbon wound layers are perpendicular to a magnetic flux linkage of the magnets, the eddy current is hard to flow on the rotor yoke.

(2) Commercially available amorphous magnetic metal ribbons typically have a thickness of 0.025 mm and are significantly thinner than electromagnetic steel sheets. This makes it possible to reduce stress after winding the amorphous magnetic metal ribbon 1 into a toroidal core. Therefore, the shape of the amorphous ribbon wound toroidal core as the rotor yoke can be retained with an adhesive alone. In addition, the amorphous metals since have the resistivity at more than three times of that of electromagnetic steel sheets, the eddy current is hard to flow in the rotor yoke. This results in eddy current loss reduction, thereby enhancing the motor efficiency enhancement.

(3) The amorphous ribbon wound toroidal core 2, the rotor magnets 4, and the rotor shaft use boss 3 since are bonded integrally with the resin, the overall strength of the rotor can be increased to permit the rotor to rotate at a high speed. In addition, a metal shaft can easily be coupled to the rotor. The laminated amorphous rotor yoke since can easily be secured, the shapes of the magnets forming the rotor magnetic poles can be changed with an increased degree of freedom.

(4) The space between the magnets can be filled with the resin 5. When the resin is used in such a manner, rotor surface irregularities can be removed to reduce windage loss. Further, the use of a general-purpose rotor shaft use boss can reduce the cost of the rotor.

Second Embodiment

A second embodiment of the present invention will now be described. FIGS. 8 to 11 illustrate a rotor structure of an axial gap motor according to the second embodiment.

Figure 9:
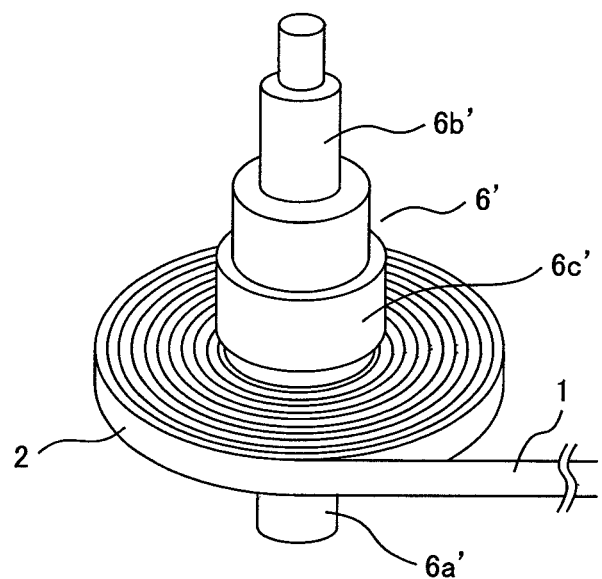
FIG. 9 is a perspective view illustrating a typical combination of the rotor shaft and rotor yoke for the axial gap motor according to the second embodiment of the present invention.

The rotor according to the present embodiment also uses an amorphous ribbon wound toroidal core as the rotor yoke 2, as is the case with the first embodiment. The rotor according to the present embodiment differs from the rotor according to the first embodiment in that the amorphous ribbon wound toroidal core 2 is formed by winding the amorphous magnetic metal ribbon 1 directly onto a rotor shaft 6', as shown in FIG. 9, without using a rotor shaft use boss. In other words, the rotor yoke 2 formed by the amorphous ribbon wound toroidal core is directly mounted on the rotor shaft 6'.

Figure 8:
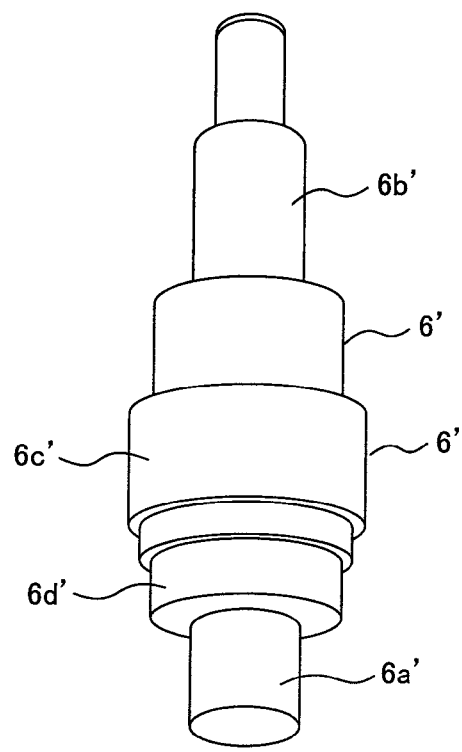
FIG. 8 is a perspective view illustrating an example of a rotor shaft of the axial gap motor according to a second embodiment of the present invention.

FIG. 8 shows the rotor shaft 6' used in the present embodiment. Portions 6a', 6b', 6c' of the rotor shaft 6' respectively correspond to the portions 6a, 6b, 6c shown in FIG. 1. The portion 6c' of the rotor shaft 6' is a portion onto which the amorphous magnetic metal ribbon 1 is directly wound. After one end at the winding start of the amorphous magnetic metal ribbon 1 is fastened at the amorphous magnetic mental ribbon wound portion 6d' with adhesion, welding, or other fastening means, the ribbon 1 is wound into a toroidal core until the required rotor yoke diameter is achieved. A winding end of the ribbon is then cut and secured.

The present embodiment relates to one rotor/one-stator type axial gap motor.

Figure 10:
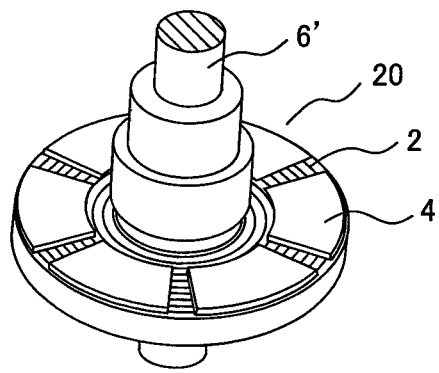
FIG. 10 is a perspective view illustrating an example of a rotor assembly process for the axial gap motor according to the second embodiment of the present invention.
Figure 11:
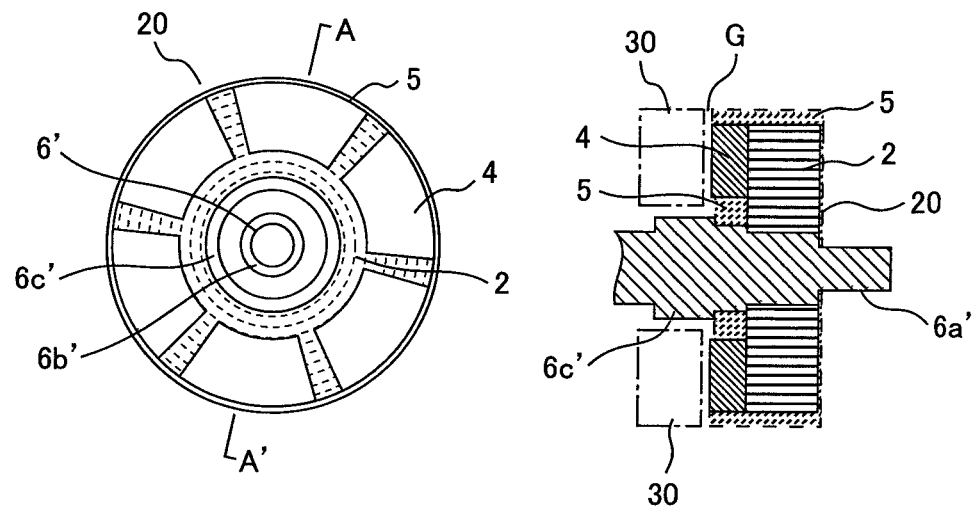
FIG. 11 is a set of a front view and a cross-sectional view, in which the front view illustrates outer coating resin applied to the rotor of the axial gap motor according to the second embodiment of the present invention, and the cross-sectional view is taken along line A-A' in the front view.

FIG. 10 shows the rotor 20 that is obtained by combining the rotor shaft 6', the amorphous ribbon wound toroidal core (rotor yoke) 2, and the magnets 4. In the present embodiment, the magnets 4, which form plural magnetic poles, are closely bonded to one surface (stator-facing surface) of the amorphous ribbon wound toroidal core 2 as shown in FIG. 10. After the magnets 4 are disposed on the amorphous ribbon wound toroidal core 2, the amorphous ribbon wound toroidal core 2 is impregnated with resin except for the surfaces of the magnets 4. FIG. 11 is a set of a front view and a cross-sectional view, in which the front view illustrates the rotor 20 that is impregnated with resin, and the cross-sectional view is taken along line A-A' in the front view.

In the present embodiment, the cross-sectional view taken along line A-A' in FIG. 11 also presents a deformed view, as is the case with FIG. 7. The surface of the impregnated resin 5 applied to the magnet 4 mounting surface of the amorphous ribbon wound toroidal core 2 is substantially flush with the surface of the magnets 4.

A stator 30 is securely disposed so as to be opposed to the surface of the rotor yoke 2 on the magnet side with an axial air gap G between the rotor yoke and the stator. The acquisition of the air gap G, the secure disposition of the stator 30, and the radial bearing support structure of the rotor are not described or shown in the figures because various conventional technologies can be used.

The second embodiment is configured so that the rotor yoke is formed by the amorphous ribbon wound toroidal core, as is the case with the first embodiment. Therefore, the second embodiment makes it possible to reduce the eddy current loss in the rotor yoke and do without the rotor shaft use boss, thereby simplifying a motor assembly process.

Third Embodiment

Figure 12:
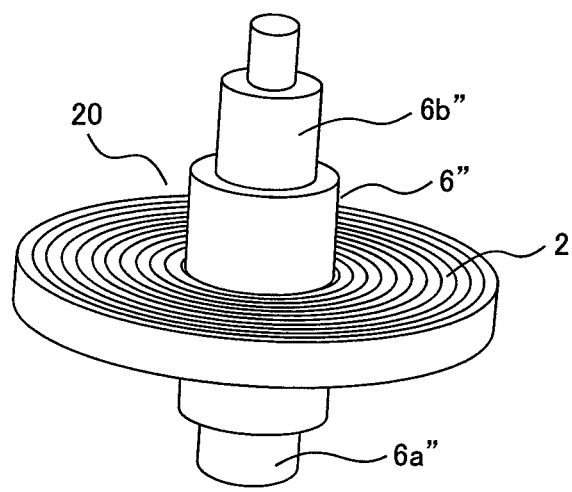
FIG. 12 is a perspective view illustrating a combination of the rotor shaft and rotor yoke for the axial gap motor according to a third embodiment of the present invention.
Figure 13:
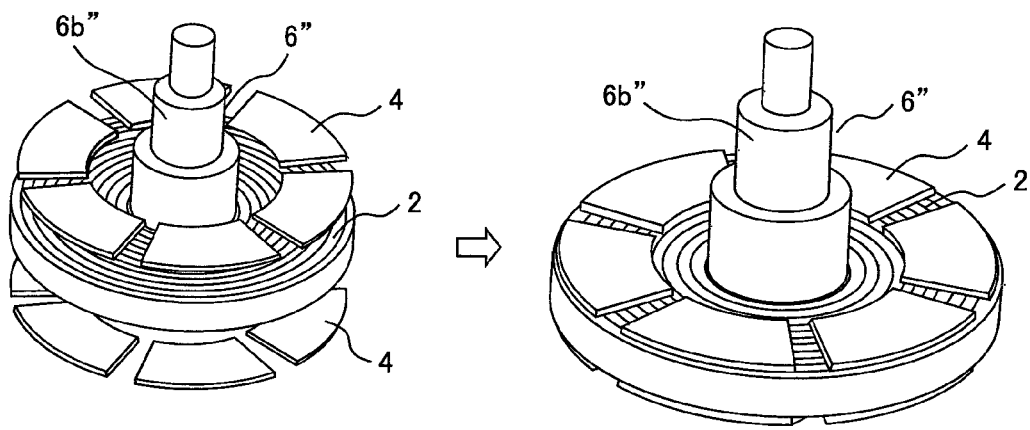
FIG. 13 is a set of perspective views illustrating a typical process for assembling the rotor of the axial gap motor according to the third embodiment of the present invention.
Figure 14:
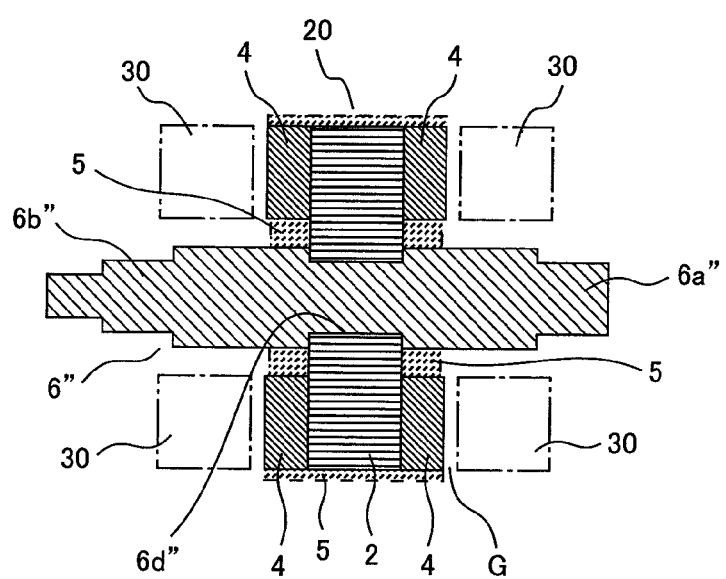
FIG. 14 is a schematic cross-sectional view illustrating a positional relationship between the rotor and stator of the axial gap motor according to the third embodiment of the present invention.

A third embodiment of the present invention will now be described. FIGS. 12 to 14 illustrate a rotor structure of an axial gap motor according to the third embodiment.

The axial gap motor according to the present embodiment includes one rotor and two stators.

FIG. 12 shows the amorphous ribbon wound toroidal core 2 as the rotor yoke is formed by directly winding an amorphous magnetic metal ribbon onto a shaft 6, in the same manner as indicated in FIG. 9, at the rotor yoke position of an axial central portion 6d'' (see FIG. 14) of a rotor shaft 6''. Portions 6a'' and 6b'' of the rotor shaft 6'' correspond to portions 6a and 6b in the first embodiment and are supported by the motor housing via a radial bearing (not shown). The present embodiment is similar to the foregoing embodiments in that the amorphous ribbon wound toroidal core 2 is impregnated with resin 5.

In the present embodiment, the same magnets 4 as in the first and second embodiments are bonded to both surfaces of the disc-shaped amorphous ribbon wound toroidal core 2, and the stators 30 are opposed to both sides of the rotor 20 in a direction parallel to the axis line of the rotor shaft with an air gap G between the rotor and the stator. Each stator 30 has the same configuration as the stator according to the foregoing embodiments. The present embodiment offers the same advantages as the foregoing embodiments and provides enhanced motor efficiency.

What is claimed is:

1. An axial gap rotating electrical machine in which a rotor and a stator are disposed so as to be opposed to each other with an air gap between the rotor and the stator in a direction parallel to an axis line of a rotor shaft, comprising:
   the rotor having a rotor yoke configured by amorphous ribbon wound toroidal core; and permanent magnets which are mounted on a stator-facing surface of the amorphous ribbon wound toroidal core and disposed in the circumferential direction of the amorphous ribbon wound toroidal core, the magnets being configured by plates,
   wherein the amorphous ribbon wound toroidal core is formed by directly being wound onto the rotor shaft thereby to be directly mounted onto the rotor shaft,
   wherein a winding start of the amorphous ribbon is fastened to the rotor shaft and a winding end of the amorphous ribbon is fastened to the amorphous ribbon wound toroidal core,
   wherein the amorphous ribbon wound toroidal core is impregnated with resin,
   wherein the impregnated resin coats a surface of the amorphous ribbon wound toroidal core at a side where the rotor magnets are disposed,
   wherein a surface of the impregnated resin on the surface of the amorphous ribbon wound toroidal core is substantially flush with or slightly lower than the surfaces of the magnets,
   wherein the amorphous ribbon wound toroidal core and the magnets are integrally bonded together by the impregnated resin, and
   wherein interlayer insulation is provided at each layer of the amorphous ribbon wound toroidal core by the impregnated resin.

2. The axial gap rotating electrical machine according to claim 1, wherein a boss is in the internal diameter of the amorphous ribbon wound troidal core.

3. The axial gap rotating electrical machine according to claim 2, wherein the amorphous ribbon wound toroidal core and the boss are integrally bonded together with resin.

4. The axial gap rotating electrical machine according to claim 2, wherein the amorphous ribbon wound toroidal core, the magnets, and the boss are integrally bonded together with resin impregnated therebetween.

5. The axial gap rotating electrical machine according claim 1, wherein the rotor yoke is comprised of an iron- or cobalt-based amorphous ribbon wound toroidal core.

6. The axial gap rotating electrical machine according claim 1, wherein the rotor is comprised of a pair of rotors between which the stator is disposed in a direction parallel to an axis line of the rotor shaft having an air gap between each rotor and the stator.

7. The axial gap rotating electrical machine according claim 1, wherein the rotor is used in an axial gap rotating electrical machine in which the rotor is positioned between a pair of stators with an air gap between each stator and the rotor; and wherein the magnets are disposed on both surfaces of the amorphous ribbon wound toroidal core.

8. An axial gap rotating electrical machine comprising:
   a stator including a plurality of coil-mounted stator cores which are disposed circumferentially around a rotor shaft; and
   a pair of disc-shaped rotors fixed to the rotor shaft such that the stator is disposed between the rotors with an air gap in a direction parallel to an axis line of the rotor shaft;
   wherein each of the rotors has a rotor yoke configured by amorphous ribbon wound toroidal core; and permanent magnets which are mounted on a stator-facing surface of the amorphous ribbon wound toroidal core and disposed in the circumferential direction of the amorphous ribbon wound toroidal core, the magnets being configured by plates,
   wherein the amorphous ribbon wound toroidal core is formed by directly being wound onto the rotor shaft thereby to be directly mounted onto the rotor shaft,
   wherein a winding start of the amorphous ribbon is fastened to the rotor shaft and a winding end of the amorphous ribbon is fastened to the amorphous ribbon wound toroidal core,
   wherein the amorphous ribbon wound toroidal core is impregnated with resin,
   wherein the impregnated resin coats a surface of the amorphous ribbon wound toroidal core at a side where the rotor magnets are disposed,
   wherein a surface of the impregnated resin on the surface of the amorphous ribbon wound toroidal core is substantially flush with or slightly lower than the surfaces of the magnets,
   wherein the amorphous ribbon wound toroidal core and the magnets are integrally bonded together by the impregnated resin, and
   wherein interlayer insulation is provided at each layer of the amorphous ribbon wound toroidal core by the impregnated resin.

9. An axial gap rotating electrical machine comprising:
   a disc-shaped rotor that is fixed to a rotor shaft; and
   a pair of stators that are disposed at both sides of the rotor with an air gap;
   wherein the rotor has a rotor yoke configured by amorphous ribbon wound toroidal core; and permanent magnets which are mounted on a stator-facing surface of the amorphous ribbon wound toroidal core and disposed in the circumferential direction of the amorphous ribbon wound toroidal core, the magnets being configured by plates,
   wherein the amorphous ribbon wound toroidal core is formed by directly being wound onto the rotor shaft thereby to be directly mounted onto the rotor shaft,
   wherein a winding start of the amorphous ribbon is fastened to the rotor shaft and a winding end of the amorphous ribbon is fastened to the amorphous ribbon wound toroidal core,
   wherein the amorphous ribbon wound toroidal core is impregnated with resin,
   wherein the impregnated resin coats a surface of the amorphous ribbon wound toroidal core at a side where the rotor magnets are disposed,
   wherein a surface of the impregnated resin on the surface of the amorphous ribbon wound toroidal core is substantially flush with or slightly lower than the surfaces of the magnets, wherein the amorphous ribbon wound toroidal core and the magnets are integrally bonded together by the impregnated resin, and wherein interlayer insulation is provided at each layer of the amorphous ribbon wound toroidal core by the impregnated resin.

10. The axial gap electrical rotating machine according to claim 1, wherein the rotor is disc-shaped.

11. The axial gap rotating electrical machine according to claim 1, wherein the impregnated resin coats a surface of the amorphous ribbon troidal core at a side where the rotor magnets are not disposed.

\* \* \* \* \*